United States Patent
Allen et al.

(10) Patent No.: US 8,610,969 B2
(45) Date of Patent: Dec. 17, 2013

(54) ILLUMINATION ASSEMBLY FOR A SCANNER WITH THERMALLY CONDUCTIVE HEAT SINK

(75) Inventors: Eugene David Allen, Richmond, KY (US); Chengwu Cui, Lexington, KY (US); Joshua Tyler Strow, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 394 days.

(21) Appl. No.: 12/979,797

(22) Filed: Dec. 28, 2010

(65) Prior Publication Data

US 2012/0162726 A1    Jun. 28, 2012

(51) Int. Cl.
*H04N 1/04* (2006.01)
(52) U.S. Cl.
USPC ............................ 358/475; 358/474; 358/471
(58) Field of Classification Search
USPC ........................... 358/475, 474, 471
See application file for complete search history.

(56) References Cited

U.S. PATENT DOCUMENTS

| | | | |
|---|---|---|---|
| 6,229,137 B1 | 5/2001 | Bohn | |
| 7,543,966 B2 | 6/2009 | Branson et al. | |
| 7,591,576 B2 | 9/2009 | Okamoto et al. | |
| 7,600,908 B2 | 10/2009 | Chang et al. | |
| 7,784,975 B2 | 8/2010 | Krebs et al. | |
| 7,924,478 B2 | 4/2011 | Kim et al. | |
| 7,973,983 B2 | 7/2011 | Lin et al. | |
| 8,059,147 B2 | 11/2011 | Taira et al. | |
| 8,109,651 B2 | 2/2012 | Chen | |
| 8,197,105 B2 | 6/2012 | Yang | |
| 8,322,872 B2 | 12/2012 | Cui et al. | |
| 2009/0003784 A1* | 1/2009 | Kabuki et al. | 385/119 |
| 2011/0007236 A1* | 1/2011 | Kim et al. | 349/58 |
| 2012/0162738 A1 | 6/2012 | Allen et al. | |

OTHER PUBLICATIONS

U.S. Appl. No. 12/979,882 Notice of Allowability dated Apr. 2, 2013 and Non-Final Office Action dated Dec. 12, 2012.

* cited by examiner

*Primary Examiner* — Qian Yang
*Assistant Examiner* — Martin Mushambo
(74) *Attorney, Agent, or Firm* — Justin M Tromp

(57) ABSTRACT

An illumination assembly for a scanner according to one example embodiment includes a scan head frame. A thermally conductive heat sink component has an elongated base portion that is mounted along a longitudinal edge of the scan head frame and a protruding portion having a generally L-shaped structure that includes a first portion extending from the base portion and a second portion extending from and generally orthogonal to the first portion. A light source is coupled to the second portion of the protruding portion of the heat sink component. A first reflector is removably coupled to the first portion of the protruding portion of the heat sink component and is positioned directly in the optical path of the light source.

20 Claims, 2 Drawing Sheets

ILLUMINATION ASSEMBLY FOR A SCANNER WITH THERMALLY CONDUCTIVE HEAT SINK

CROSS REFERENCES TO RELATED APPLICATIONS

This application is related to U.S. patent application Ser. No. 12/979,882, which is incorporated herein by reference, entitled "Illumination Assembly for a Scanner" filed on even date herewith and assigned to the same assignee as the present application.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to scanners, and more specifically, to an is illumination assembly for a scanner.

2. Description of the Related Art

Developments in the field of scanners have improved the scanning speed of scanners. High speed scanners typically require high intensity illumination. A light source, such as an external electrode xenon fluorescent lamp, may be utilized in the scanners to provide the required illumination. However, xenon fluorescent lamps may generate excessive heat. In some instances, the excess heat may impact the scanner's life and the scanning quality of the scanner.

Recent technological developments in the field of scanners have provided another light source, white LEDs (light emitting diodes). To achieve high intensity illumination, either a single high power LED or an array of medium power LEDs may be utilized. The use of LEDs to provide high intensity illumination may also generate a considerable amount of heat, which may impact the scanner's life and the scanning quality. Accordingly, it will be appreciated that an illumination assembly for a scanner that provides high intensity illumination in a thermally efficient manner is desired.

SUMMARY OF THE DISCLOSURE

An illumination assembly for a scanner according to one example embodiment includes a scan head frame. A thermally conductive heat sink component has an elongated base portion that is mounted along a longitudinal edge of the scan head frame and a protruding portion having a generally L-shaped structure that includes a first portion extending from the base portion and a second portion extending from and generally orthogonal to the first portion. A light source is coupled to the second portion of the protruding portion of the heat sink component. In some embodiments, the second portion of the protruding portion of the heat sink component extends from the first portion generally in the direction of a target area to be scanned.

A first reflector is removably coupled to the first portion of the protruding portion of the heat sink component and is positioned directly in the optical path of the light source. In some embodiments, the first reflector is adjustably mounted on the heat sink component to permit adjustment of the first reflector relative to the light source. Embodiments include those wherein the first reflector has a generally C-shaped structure that substantially encloses the light source to prevent direct illumination of a target area to be scanned by the light source. Some embodiments further include a second reflector having a reflecting portion and a support flange extending from the reflecting portion and mounted on the scan head frame. In these embodiments, the first reflector includes a first portion positioned to reflect light received from the light source toward the target area and a second portion positioned to reflect light received from the light source toward the second reflector. The second reflector is positioned to reflect light received from the first reflector toward the target area. In some embodiments, the first portion of the first reflector is mounted along and conforms to a length of the heat sink component.

Additional embodiments include a printed circuit board mounted on the second portion of the protruding portion of the heat sink component. In these embodiments, the light source is mounted on and electrically coupled to the printed circuit board. Some embodiments include an adjustment mechanism that adjustably mounts the base portion of the heat sink component along the longitudinal edge of the scan head frame and permits adjustment of the heat sink component relative to the scan head frame.

BRIEF DESCRIPTION OF THE DRAWINGS

The above-mentioned and other features and advantages of this disclosure, and the manner of attaining them, will become more apparent and the disclosure will be better understood by reference to the following description of embodiments of the disclosure taken in conjunction with the accompanying drawings, wherein.

DETAILED DESCRIPTION

It is to be understood that various omissions and substitutions of equivalents are contemplated as circumstances may suggest or render expedient, but these are intended to cover the application or implementation without departing from the spirit or scope of the claims of the present disclosure. It is to be understood that the present disclosure is not limited in its application to the details of components set forth in the following description. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the terms "a" and "an" herein do not denote a limitation of quantity, but rather denote the presence of at least one of the referenced item. Furthermore, the terms "first," "second," and the like, herein do not denote any order, quantity, or importance, but rather are used to distinguish one element from another. Unless limited otherwise, the terms "coupled," and variations thereof herein are used broadly and encompass direct and indirect couplings. Moreover, the use of "coupled" and variations thereof herein does not denote a limitation to the arrangement of two components.

The present disclosure provides an illumination assembly for a scanner. The illumination assembly provides high intensity illumination to be focused on a target area, such as a media sheet, to be scanned. Further, the illumination assembly removes heat generated by a light source that provides the high intensity illumination. The illumination assembly also provides for the efficient replacement of a primary reflector as desired.

Figure 1:
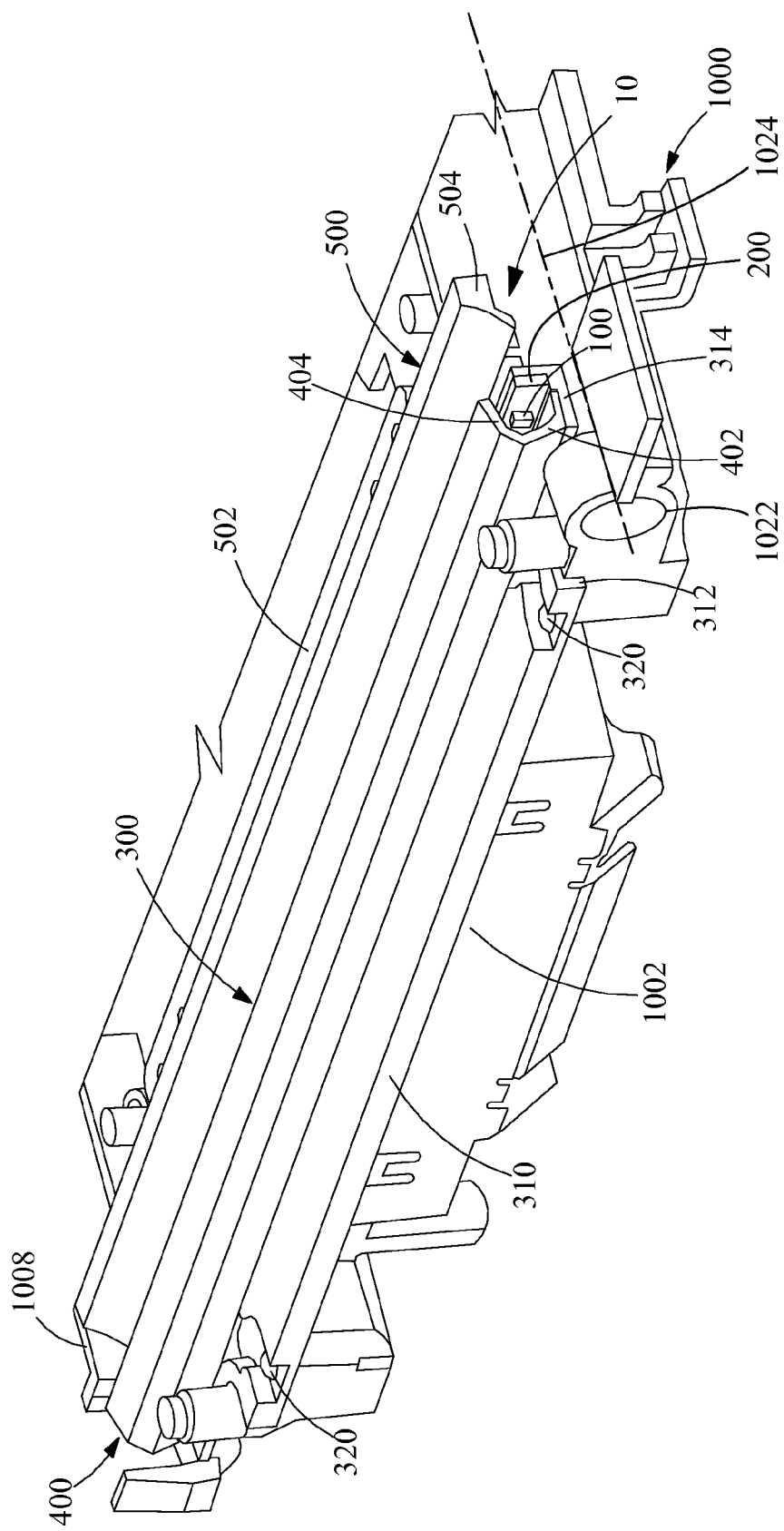
FIG. 1 is a perspective view of an illumination assembly positioned on a scan head frame of a scanner, according to one example embodiment.
Figure 2:
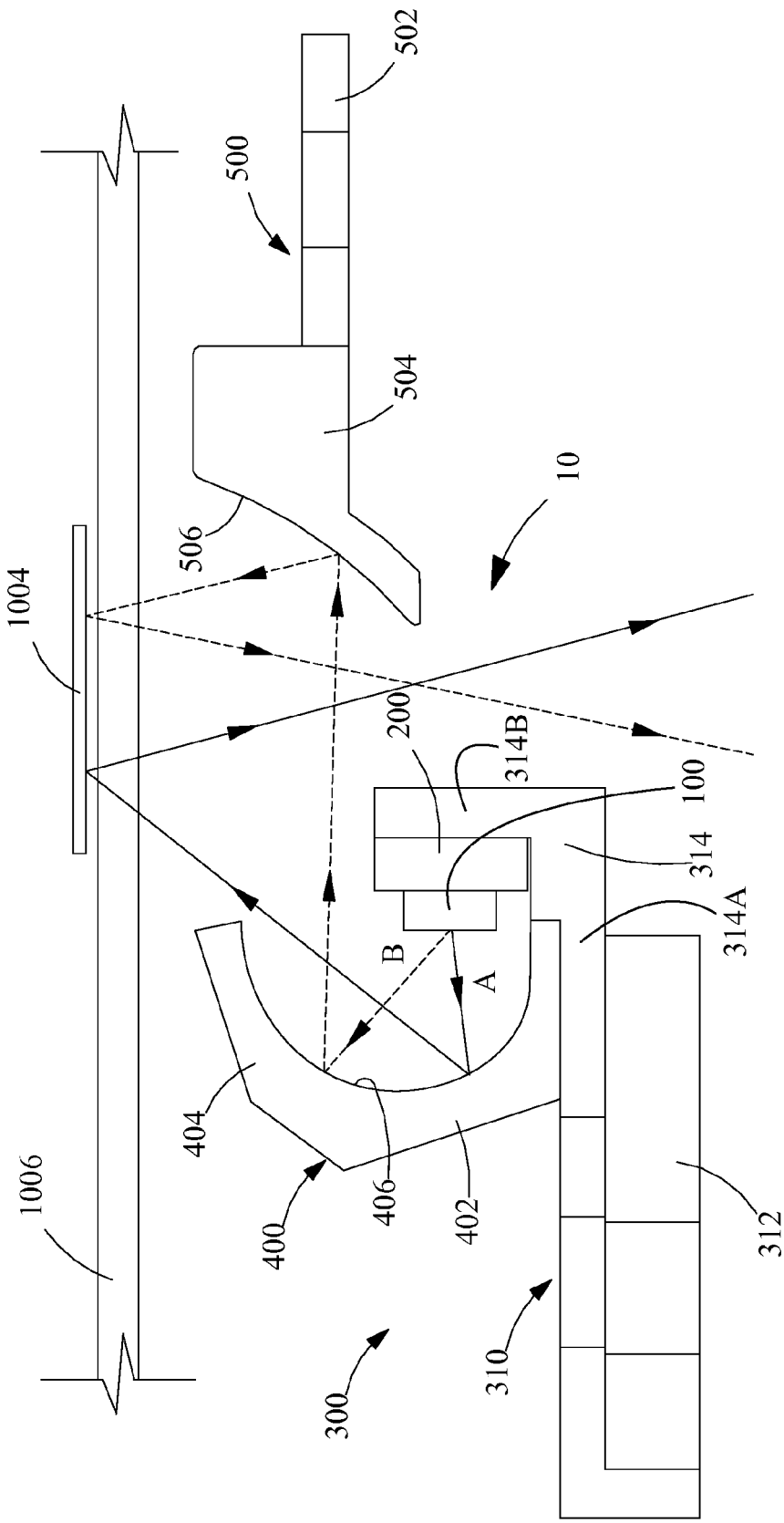
FIG. 2 is a side view of the illumination assembly of FIG. 1 in a utilized state.

Referring now to FIGS. 1-2, an illumination assembly 10 for a scanner is shown. Specifically, FIG. 1 is a perspective view of illumination assembly 10 positioned on a scan head frame 1000 of the scanner and FIG. 2 is a side view of illumination assembly 10 of FIG. 1 in operation.

As shown in FIG. 1, illumination assembly 10 includes a light source 100. Light source 100 may include at least one light emitting diode (LED). In the example embodiment illustrated, light source 100 is an array of white LEDs positioned in a uniform manner. In some embodiments, light source 100 is an array of blue LEDs coated with yellow phosphor for yielding white light. Alternatives include those wherein a single high power white LED is utilized as a light source. Moreover, instead of utilizing blue LEDs coated with yellow phosphor, an array of red LEDs, green LEDs and blue LEDs may be utilized as white LEDs.

Illumination assembly 10 further includes a printed circuit board (PCB) 200. PCB 200 supports light source 100 thereon. Specifically, light source 100 is electrically coupled with PCB 200 by a suitable process, such as soldering, which allows mechanical mounting of light source 100 on PCB 200. PCB 200 allows light source 100 to receive electrical power from a power source.

Illumination assembly 10 also includes a reflector assembly 300. Reflector assembly 300 includes a heat sink component 310. Heat sink component 310 is mounted on scan head frame 1000, as shown in FIG. 1. In the example embodiment illustrated, heat sink component 310 is an elongated structure such that heat sink component 310 mounts along a longitudinal edge portion 1002 of scan head frame 1000. Specifically, heat sink component 310 includes a base portion 312 (best shown in FIG. 2) mounted on longitudinal edge portion 1002 of scan head frame 1000, which will be explained in detail herein later. Base portion 312 has a shape that conforms to longitudinal edge portion 1002 thereby allowing heat sink component 310 to be suitably and rigidly mounted on scan head frame 1000.

Heat sink component 310 also includes a protruding portion 314 integral with base portion 312. In the example embodiment illustrated, protruding portion 314 has a generally L-shaped structure. Protruding portion 314 includes a first portion 314A and a second portion 314B. First portion 314A extends from base portion 312. Second portion 314B extends from and is generally orthogonal to first portion 314A. Second portion 314B extends from first portion 314A generally in the direction of target area 1004. Second portion 314B of protruding portion 314 of heat sink component 310 supports PCB 200 thereon with the help of suitable attachment means, such as adhesive. As explained herein, PCB 200 supports light source 100 thereon; therefore, light source 100 is also supported by protruding portion 314 of heat sink component 310. Heat sink component 310 may be made of a thermally conductive material, such as a metal. The metal may include but is not limited to aluminum, copper, tungsten, molybdenum or a combination thereof.

Illumination assembly 10 also includes an adjustment mechanism 320 for adjustably mounting reflector assembly 300 on scan head frame 1000. Specifically, adjustment mechanism 320 adjustably mounts base portion 312 of heat sink component 310 on longitudinal edge portion 1002 of scan head frame 1000, as shown in FIG. 1. Adjustment mechanism 320 may include a nut and bolt arrangement or screws. Base portion 312 and longitudinal edge portion 1002 may include a set of aligned holes (not shown) for receiving adjustment mechanism 320, e.g., the nut and bolt arrangement or the screws. Each of the aligned holes may be an elongated hole that allows base portion 312 to be moved about the bolts or screws. This allows base portion 312 to be transversely and/or angularly adjusted with respect to longitudinal edge portion 1002 prior to rigidly mounting base portion 312 on longitudinal edge portion 1002 with adjustment mechanism 320.

Reflector assembly 300 further includes a primary reflector 400 coupled to heat sink component 310. Primary reflector 400 is positioned directly in the optical path of light source 100 and is sufficiently spaced apart from light source 100 to reduce heat transfer from light source 100 to primary reflector 400. In the example embodiment illustrated, primary reflector 400 has a generally elongated C-shaped structure that conforms to a length of heat sink component 310. The generally C-shaped structure of primary reflector 400 substantially encloses light source 100 and thereby defines a light path therethrough. More specifically, a space (best shown in FIG. 2) between primary reflector 400 and protruding portion 314 of heat sink component 310 may be considered as the light path. The light path allows the light generated by light source 100 to reach a target area 1004 (shown in FIG. 2). Target area 1004 may be a media sheet to be scanned disposed on a platen glass 1006 of the scanner.

Primary reflector 400 includes a first portion 402 that is coupled with first portion 314A of protruding portion 314 of heat sink component 310 using a suitable attachment means, such as adhesive or screws. In some embodiments, first portion 402 is adjustably mounted on protruding portion 314 to allow the position of primary reflector 400 to be adjusted relative to light source 100 and target area 1004. Primary reflector 400 also includes a second portion 404 integral with first portion 402 forming the generally C-shaped structure of primary reflector 400. Alternatives include those wherein first portion 402 and second portion 404 are separate components coupled to one another. Primary reflector 400 has a reflecting surface 406 (shown in FIG. 2), positioned in the optical path of light source 100. In the example embodiment illustrated, reflecting surface 406 has a substantially single-faceted, smooth, curved surface. Alternatively, reflecting surface 406 may have a multi-faceted surface. In such alternatives, each of first portion 402 and second portion 404 of primary reflector 400 may include a plurality of angularly oriented straight sections that form multi-faceted reflecting surface 406 of primary reflector 400.

Primary reflector 400 may be made of a reflective material having a desired reflectance. For example, the reflective material may be spectrally matched to light source 100 to achieve a desired combined spectral characteristic. Further, primary reflector 400 may be made of a molded material which exhibits the desired reflection. For example, primary reflector 400 may be made of a plastic material or a glass, which may be molded to acquire a desired shape. In some embodiments, primary reflector 400 is removably mounted on heat sink component 310 by attachment means such as screws, nuts and bolts or snap features thereby permitting efficient replacement of primary reflector 400. Such replacement may be desired to quickly change the shape, condition or color of reflecting surface 406.

As shown in FIG. 1, illumination assembly 10 further includes an auxiliary reflector 500. Auxiliary reflector 500 is positioned on a portion 1008 (shown in FIG. 1) of scan head frame 1000 that is on an opposite side of target area 1004 from primary reflector 400, as shown FIG. 2. Specifically, auxiliary reflector 500 includes a support flange 502 mounted on scan head frame 1000 with the help of a suitable attachment means, such as adhesive or screws. Auxiliary reflector 500 also includes a reflecting portion 504 integral with and extending from support flange 502. It will be appreciated that reflecting portion 504 and support flange 502 may also be separate components coupled to one another. Reflecting portion 504 includes a curved reflecting surface 506 (shown in FIG. 2), such as a parabolic surface or a concave surface. Curved reflecting surface 506 reflects light reflected by the primary reflector 400 from light source 100 towards target area 1004, which will be explained further in greater detail. Further, it will be appreciated by those skilled in the art that reflecting portion 504 may have a substantially planar reflecting surface or a curved reflecting surface, such as an elliptical surface or a convex surface. Auxiliary reflector 500, particularly reflecting portion 504, may be composed of molded plastic or glass which exhibits the desired reflection.

As shown in FIG. 2, in use, illumination assembly 10 is positioned on scan head frame 1000 (shown in FIG. 1) under platen glass 1006 of the scanner. In the example embodiment illustrated, illumination assembly 10 reciprocates back and forth under platen glass 1006 along with scan head frame 1000 which is driven by a driving mechanism (not shown) of the scanner. Embodiments include those wherein scan head frame 1000 includes at least one pair of bushings 1022 aligned along bushing axis 1024 at a distal end of scan head frame 1000. Bushings 1022 receive a guide rod (not shown) to facilitate reciprocating back-and-forth movement of the scanner along the guide rod to permit the scanner to scan the entirety of an adjacent document. Alternatives include those wherein scan head frame 1000 is mounted in a stationary manner such as along a media path of an automatic document feeder as is known in the art.

Light source 100 is provided with the requisite electrical power for emitting light. The light emitted from light source 100 is reflected towards target area 1004 by primary reflector 400 and auxiliary reflector 500. Specifically, as shown in FIG. 2, a light ray (shown with solid lines 'A') may be directly reflected by first portion 402 of primary reflector 400 towards target area 1004 through platen glass 1006. For purposes of clarity, a single light ray 'A' is shown to reflect from first portion 402 when light source 100 emits light. However, it will be appreciated that a plurality of light rays, such as light ray 'A', originate from light source 100 and are reflected by first portion 402 of primary reflector 400 towards target area 1004.

The light ray 'A' following the first path is further shown to reflect from target area 1004, such as the media to be scanned, to be captured by an image sensor (not shown) such as a charge coupled device of the scanner. Once light ray 'A' reflects from target area 1004, light ray 'A' may carry a particular amount of energy based on a transparency/opaqueness of target area 1004. The image sensor receives light ray 'A' and converts the light energy carried by light ray 'A' into a digital image of target area 1004. Light ray 'A' may be reflected onto the image sensor by one or more mirrors of a mirror assembly (not shown). Further, a lens (not shown) may be provided to focus light ray 'A' onto the image sensor.

Further, as shown in FIG. 2, a light ray (shown with hidden lines 'B') is indirectly reflected by second portion 404 of primary reflector 400 towards target area 1004. Specifically, reflecting portion 504 of auxiliary reflector 500 reflects light ray 'B', reflected from second portion 404 of primary reflector 400. For purposes of clarity, a single light ray 'B' is shown to reflect from second portion 404 of primary reflector 400. Light ray 'B' reflected by reflecting portion 504 passes through platen glass 1006 and is reflected from target area 1004. Thereafter, light ray 'B' may be similarly captured by the mirror assembly, which will reflect light ray 'B' towards the lens and finally light ray 'B' may be focused onto the image sensor. The image sensor will receive light ray 'B' and convert a light energy carried by light ray 'B' into a digital image of a portion, incident with light ray 'B', of target area 1004.

Therefore, illumination assembly 10, particularly a combination of light source 100, primary reflector 400, and auxiliary reflector 500, provides high intensity illumination. Specifically, primary reflector 400 and auxiliary reflector 500 provide efficient illumination of rays (e.g., light rays 'A' and 'B') emitted by light source 100 and reflected towards target area 1004. Further, the design and arrangement of primary reflector 400 and auxiliary reflector 300 avoid wastage of light such that the amount of light emitted by light source 100 that does not contact target area 1004 is minimized. It will be appreciated that a distance between light source 100 and primary reflector 400 may be adjusted by moving or tilting primary reflector 400. Further, a distance between primary reflector 400 and auxiliary reflector 500 may be adjusted with the help of adjustment mechanism 320. This allows the intensity and distribution of light from light source 100 to be adjusted to achieve a desired illumination at target area 1004. As shown in FIG. 2, primary reflector 400 and auxiliary reflector 500 allow target area 1004 to avoid direct contact with the light from light source 100. Specifically, the light from light source 100 reflects from primary reflector 400 and auxiliary reflector 500 prior to reaching target area 1004. This allows sufficient mixing of light, which permits a better scanning quality of target area 1004.

Further, the heat generated by light source 100 and other electrical components (not shown) on scan head frame 1000 is dissipated by heat sink component 310. For example, during scanning, the light emitted by light source 100 may generate heat, which may be absorbed and dissipated by heat sink component 310 to a surrounding area of scan head frame 1000. In the example embodiment illustrated, the mounting of PCB 200 along with light source 100 on protruding portion 314 of heat sink component 310 allows heat sink component 310 to absorb considerable amounts of heat generated by light source 100. Further, primary reflector 400 and auxiliary reflector 500 restrict the light rays of light source 100 in proximity to heat sink component 310, which further allows heat sink component 310 to absorb and dissipate heat generated by light source 100. The heat dissipated by heat sink component 310 to the surrounding area of scan head frame 1000 may be further allowed to dissipate to an area surrounding the scanner with the help of vents or openings on the scanner's body.

Illumination assembly 10 provides high intensity illumination to a scanner in a thermally efficient manner. The illumination assembly of the present disclosure may be mounted on or coupled with a scan head frame of the scanner with reduced structural complexities. Further, the illumination assembly provides high intensity illumination in a cost effective manner. The illumination assembly also improves a scanning quality of the scanner by providing a sufficiently mixed light focused on a target area. Additionally, the illumination assembly dissipates the heat generated by a light source and the electrical components of the scan head frame. This allows the electrical components to operate in desired temperatures, which increases the life of the scanner and further improves the scanning quality of the scanner. Further, removable mounting of the primary reflector permits efficient replacement of the primary reflector as desired.

The foregoing description of several embodiments of the present disclosure has been presented for purposes of illustration. It is not intended to be exhaustive or to limit the present disclosure to the precise forms disclosed, and obviously many modifications and variations are possible in light of the above teaching. It is intended that the scope of the present disclosure be defined by the claims appended hereto.

What is claimed is:

1. An illumination assembly for a scanner, comprising:
   a scan head frame;
   a thermally conductive heat sink component having an elongated base portion mounted along a longitudinal edge of the scan head frame and a protruding portion having a generally L-shaped structure that includes a first portion extending from the base portion and a second portion extending from and generally orthogonal to the first portion;
   a light source coupled to the second portion of the protruding portion of the heat sink component; and
   a first reflector removably coupled to the first portion of the protruding portion of the heat sink component and positioned directly in the optical path of the light source.

2. The illumination assembly of claim 1, wherein the second portion of the protruding portion of the heat sink component extends from the first portion generally in the direction of a target area to be scanned.

3. The illumination assembly of claim 1, further comprising a printed circuit board mounted on the second portion of the protruding portion of the heat sink component, wherein the light source is mounted on and electrically coupled to the printed circuit board.

4. The illumination assembly of claim 1, further comprising an adjustment mechanism that adjustably mounts the base portion of the heat sink component along the longitudinal edge of the scan head frame and permits adjustment of the heat sink component relative to the scan head frame.

5. The illumination assembly of claim 1, wherein the first reflector has a generally C-shaped structure that substantially encloses the light source to prevent direct illumination of a target area to be scanned by the light source.

6. The illumination assembly of claim 1, wherein the first reflector is adjustably mounted on the heat sink component to permit adjustment of the first reflector relative to the light source.

7. The illumination assembly of claim 1, further comprising:
   a second reflector having:
      a reflecting portion that includes a reflecting surface; and
      a support flange extending from the reflecting portion and mounted on the scan head frame,
   wherein the first reflector includes a first portion positioned to reflect light received from the light source toward a target area to be scanned and a second portion positioned to reflect light received from the light source toward the second reflector, and the second reflector is positioned to reflect light received from the first reflector toward the target area.

8. The illumination assembly of claim 7, wherein the first portion of the first reflector is mounted along and conforms to a length of the heat sink component.

9. The illumination assembly of claim 7, wherein a reflecting surface of the first reflector is a substantially single-faceted, curved surface.

10. The illumination assembly of claim 7, wherein a reflecting surface of the first reflector is a multi-faceted surface.

11. The illumination assembly of claim 10, wherein the first portion and the second portion of the first reflector each include a plurality of angularly oriented substantially straight sections.

12. The illumination assembly of claim 7, wherein the second reflector is positioned on an opposite side of the target area from the first reflector.

13. The illumination assembly of claim 7, wherein the reflecting surface of the second reflector is curved.

14. The illumination assembly of claim 7, wherein the reflecting surface of the second reflector is substantially planar.

15. The illumination assembly of claim 1, wherein the light source includes at least one white LED.

16. An illumination assembly for a scanner, comprising:
   a scan head frame;
   a thermally conductive heat sink component having an elongated base portion mounted along a longitudinal edge of the scan head frame and a protruding portion having a generally L-shaped structure that includes a first portion extending from the base portion and a second portion extending from the first portion generally in the direction of a target area to be scanned and generally orthogonal to the first portion;
   a printed circuit board mounted on the second portion of the protruding portion of the heat sink component;
   a light source mounted on and electrically coupled to the printed circuit board;
   a first reflector removably coupled to the first portion of the protruding portion of the heat sink component and positioned directly in the optical path of the light source; and
   a second reflector having a reflecting portion and a support flange extending from the reflecting portion and mounted on the scan head frame;
   wherein the first reflector includes a first portion positioned to reflect light received from the light source toward the target area and a second portion positioned to reflect light received from the light source toward the second reflector, and the second reflector is positioned to reflect light received from the first reflector toward the target area.

17. The illumination assembly of claim 16, further comprising an adjustment mechanism that adjustably mounts the base portion of the heat sink component along the longitudinal edge of the scan head frame and permits adjustment of the heat sink component relative to the scan head frame.

18. The illumination assembly of claim 16, wherein the first reflector is adjustably mounted on the heat sink component to permit adjustment of the first reflector relative to the light source.

19. The illumination assembly of claim 16, wherein the first portion of the first reflector is mounted along and conforms to a length of the heat sink component.

20. The illumination assembly of claim 16, wherein the first reflector has a generally C-shaped structure that substantially encloses the light source to prevent direct illumination of a target area to be scanned by the light source.

* * * * *